Patented Sept. 21, 1948

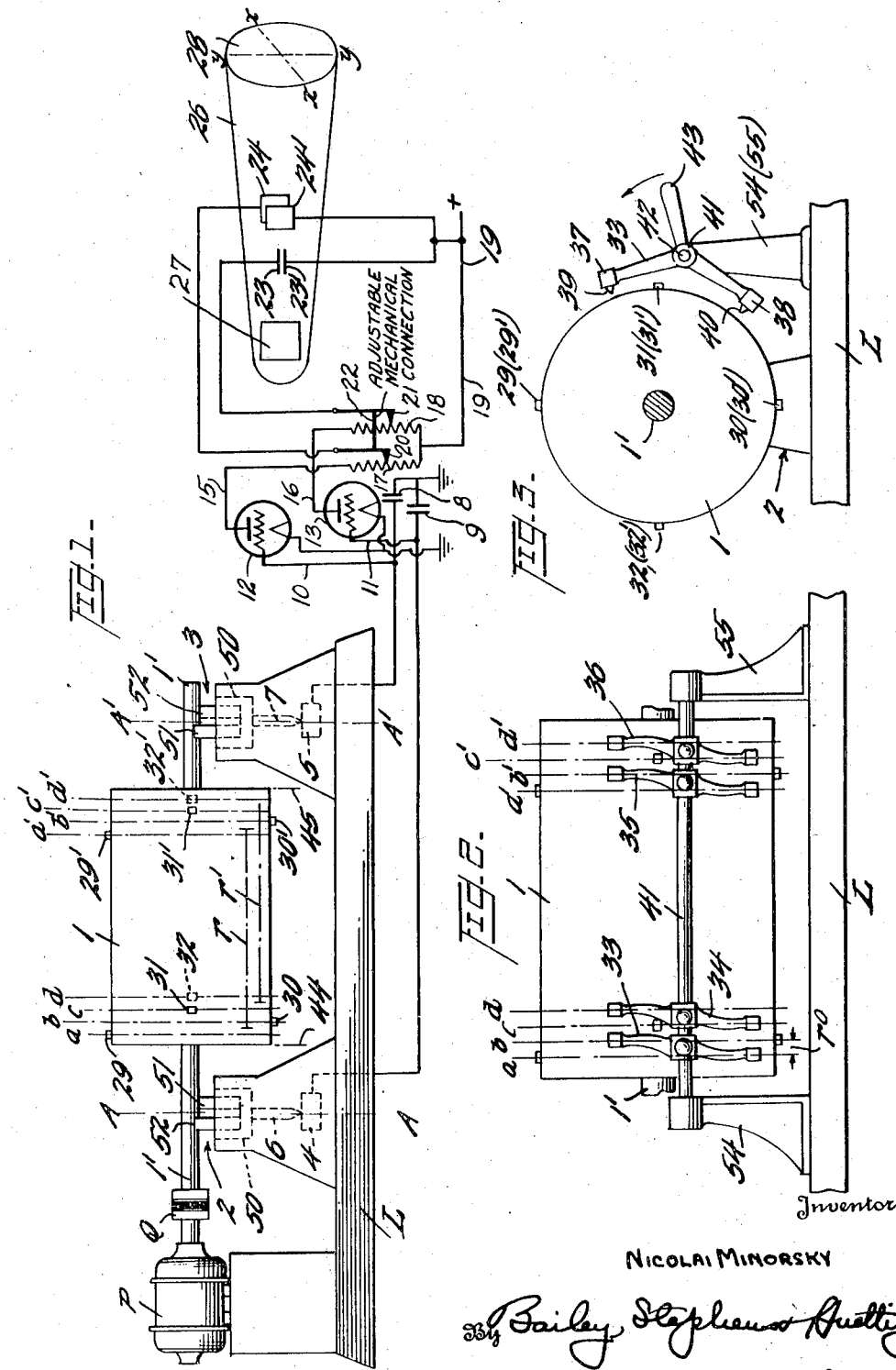

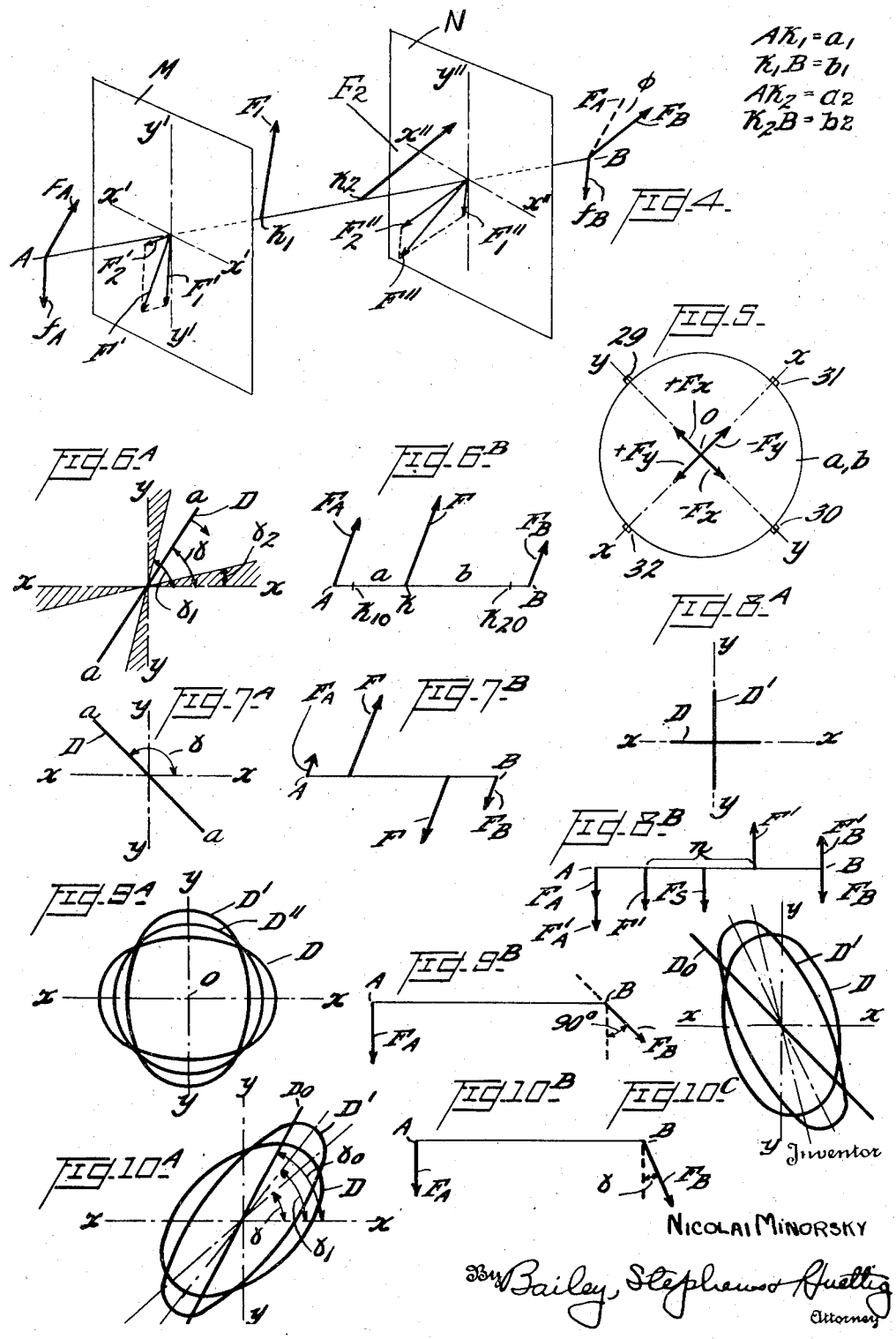

2,449,563

UNITED STATES PATENT OFFICE 2,449,563

BALANCING MACHINE

Nicolai Minorsky, Bethesda, Md., assignor to Gyro-Balance Corporation, Greenwich, Conn., a corporation of Connecticut Application May 4, 1943, Serial No. 485,656

3 Claims. (Cl. 29—1)

This invention relates to improvements in balancing machines of a type in which a continuous balancing procedure is guided by observations obtained by means responsive to the conditions of the prevailing unbalance.

More specifically the balancing machine forming the subject of this invention possesses the following characteristic advantages:

(a) Continuity of the balancing procedure without necessity of stopping the body to be balanced, referred to in the following as the rotor, for the purpose of adjusting the balancing weights;

(b) Independence of the balancing operation of the speed of the rotor;

(c) Independence of said operation of the parasitic phase angle, which complicates the balancing operation in the existing balancing machines.

The first mentioned advantage (a) derives from the fact that a deceleration and subsequent acceleration of the rotor required for the adjustment of magnitude and of angular position of balancing weight on the rotor during its stoppage, require generally a considerable time particularly for very high speed rotors, such as modern gyroscopes which results in a loss of time and hence in a decreased efficiency of the balancing work.

The second mentioned advantage (b) is also important insofar as the existing balancing methods and machines become less reliable if the speed at which the balancing operation is performed is increased. This is the main reason why the existing balancing practice consists in balancing rotors normally intended to operate at a very high speed, at a considerably lower speed at which the existing methods and apparatus give satisfactory results. The drawback of this last mentioned procedure lies in the fact that a relatively satisfactory state of balance obtained at a lower speed may be entirely unsatisfactory at the normal high speed at which no efficient balancing can be obtained by the existing methods. The present invention permits of performing the balancing operation at any speed however high.

The third mentioned advantage (c) can be explained as follows. In the existing balancing machines based on the instantaneous observation of a certain characteristic condition of the rotor isolated from other preceding or following conditions by suitable means such as a flash of a stroboscopic light or other, it is generally assumed that the observed condition, such as deflection of a certain member compressing for instance a piezo-electric element or other pressure registering means, is in phase with the rotating unbalance force which it is desired to determine angularly at this instant. Such assumption is, generally, approximately correct and valid only for relatively small speeds owing to the existence of the so-called parasitic phase angle due partially to electrical causes, for instance such as the presence of electric filters in the circuit, and partially to mechanical causes due to exceedingly complicated and unpredictable effects of inertia, damping, molecular effects in the oil films in bearings, gyroscopic action and the like. While the electrical component of the parasitic phase angle can be determined and compensated for by suitable electrical means, such as phase shifting circuits and the like, the mechanical component of said angle remains totally unknown and unpredictable and therefore accounts for a lack of reliability of the balancing procedure particularly at higher speeds at which its effects are increased. According to this invention the balancing procedure is made entirely independent of said undesirable effects of said parasitic phase angles as will be explained in the following.

In order to attain these three basic advantages in addition to a number of others which will be specified below, I provide a method and means for producing the balancing forces and balancing couples with respect to the rotating axes of reference which are fixed with respect to the rotor. Since the unbalance forces and unbalance couples are also fixed with respect to said system of reference, I am able to obtain in this manner a condition of compensation of said last mentioned unbalance forces and couples by said first mentioned balancing forces and couples while the body is rotating, without any necessity for stopping it.

In order to be able to guide the balancing operation produced with respect to said rotating axes, or otherwise expressed, with respect to the rotating frame of reference, I provide means responsive to the prevailing state of unbalance on both bearings simultaneously, said responsive means being operatively associated with suitable indicating means exhibiting said conditions of the prevailing unbalance in the form of a luminous curve observed on a screen of a cathode ray oscillograph or an equivalent device.

The balancing procedure according to this invention consists in controlling the variation of balancing forces and balancing couples both in magnitude and in direction in response to corresponding variation of the shape, size, and orientation of said luminous curve in accordance with the method specified in the following.

From this preliminary disclosure of the broad features of this present invention the above stated fundamental advantages (a), (b), (c) become apparent.

In fact, said feature (a) becomes apparent because owing to the method and means of producing and controlling the magnitude and direction of balancing forces and balancing couples with respect to the rotating frame of reference in which the original unbalance forces and couples also remain fixed, there is no necessity for stopping the rotor for subsequent adjustments so that the balancing operation is continuous in the above defined sense.

The second feature (b) is also apparent because both the balancing operation and the indicating means which guide it towards the obtaining of a perfect balance, being individually independent of the speed, the balancing procedure as a whole does not depend on the speed either.

The third mentioned feature (c) becomes clear owing to the fact that the balancing operation according to this invention is conducted in response to the state of unbalance existing at both bearings simultaneously. The effect of the parasitic phase angles referred to above cancel therefore in the combined response of both bearings, said response being represented by a luminous curve on the screen which guides the balancing procedure.

A number of additional advantages of this invention will become apparent from the following description accompanied by drawings in which one embodiment of the invention is illustrated by way of example.

In the drawings,

Figure 1 shows diagrammatically in side elevation the balancing machine with the block diagram of electric circuits and the cathode ray oscillograph shown substantially in perspective;

Figure 2 is a view in side elevation showing a detail of the rotor shown in Figure 1 and the arrangement of the material removing tools;

Figure 3 is an end view of the rotor and the removing tools;

Figure 4 represents the vector diagram of rotating forces and their compensating components in the balancing planes;

Figure 5 is a diagram illustrating the method of balancing with respect to the rotating axes;

Figures 6A, 7A, 8A, 9A, and 10A, and 10C, are diagrams showing the various forms of luminous curves observed on the screen of the cathode ray oscillograph for various conditions of balancing; and Figures 6B, 7B, 8B, 9B, and 10B are diagrams showing the corresponding dynamical conditions giving rise to the occurrence of luminous curves shown in Figures 6A, 7A, 8A, 9A, 10A, and 10C respectively.

Referring to Figure 1, the reference numeral 1 indicates the piece to be balanced, which is designated in the following as the rotor, and has a shaft 1' rotatably mounted in two bearings 2, 3, shown as the usual bearings employed for balancing. The rotor 1 is driven by a motor P through a coupling Q, and the whole device is supported on a base L.

According to this invention the alternating component unbalance forces acting in the bearings along a fixed axis shown as a vertical axis AA (A'A') are transformed into electrical voltages suitably combined into a resultant response characterizing the state of the prevailing unbalance which is eliminated by means hereinafter described.

For this purpose I propose to use any well known instantaneous pressure responsive material such as piezo-electric quartz elements 4, 5, mounted in suitable mountings not shown, so as to respond to alternating unbalance pressures transmitted for instance by means of struts 6, 7, shown in dotted lines, and supporting the bearing members 50 which carry rollers 51 and 52 which receive the shaft 1', substantially as shown. Supporting means of similar construction are shown and described in application Serial No. 266,714 of Rouy filed April 7, 1939, now Patent No. 2,329,654, granted September 14, 1943.

It is to be understood that the pressure responsive scheme does not form the subject of this invention and for that reason is described with a minimum of details. Instead of a quartz system, I can use any other well known similar system such as a magnetostriction pressure responsive system, carbon-pile elements, or the like.

In the following, however, a piezo-electric quartz system is described as a preferred embodiment of this invention particularly suited for a high speed balancing.

The alternating potentials generated in quartz crystals 4, 5, in response to the alternating vertical components of unbalance forces, are applied by means of condensers 8, 9, substantially as shown, to the input terminals 10, 11 of the grids of two vacuum tube amplifiers 12, 13.

The numerals 15 and 16 designate output terminals of the plates of the vacuum tube amplifiers, connected to resistors 17 and 18 and through them to the positive terminal 19 of B supply source, not shown. Resistors 17 and 18 are preferably supplied with attenuators indicated by sliding contacts 20, 21 which permit adjusting the individual ratios of amplification of the tubes for the purpose of adjustments as will be explained. There is also provided a common adjustment 22 for changing the ratio of both amplifiers by the same amount; this last mentioned adjustment is an adjustable mechanical connection between the contacts indicated by 22. The contacts 20, 21 of the amplifiers are connected to deflecting plates 23, 24 of a cathode ray tube 26, the other plates 23', 24' of which are connected to the positive terminal 19. Any other connection well known in the art can be also employed for the purpose specified below. The operation of this part of the system is apparent. The voltages impressed on the grids of tubes 12 and 13, in view of what has been previously explained, represent in magnitude and phase the dynamic reactions received by the piezo crystals. If tubes 12 and 13 are adjusted to function on their substantially rectilinear parts of ($V_g$, $I_p$) characteristics, the plate current variations are also representative of these reactions, both in magnitude and phase, and so are the potential drops in the plate resistors 17 and 18. In view of these connections, the electric field on 23, 23' on the one hand, and 24, 24' on the other, are proportional to the ohmic drops across resistors 17 and 18, hence to the current variations and to $E_g$ of 12 and $E_g$ of 13 and therefore to the dynamic reactions, which they represent both in magnitude and phase. This results in the Lissajou curves on the screen hereinafter described.

The adjustment of the magnitude of the oscillation (individually or jointly) along the $xx$ and the $yy$ axes is accomplished by means of the sliding contacts 20, 21.

The cathode ray tube is of an ordinary commercial type comprising, in addition to said deflecting plates, the usual source of emission, focusing arrangement, and similar details which are omitted in Figure 1. However, there is shown in this figure a cathode element 27 and a screen 28 for a visual observation of the path of the electronic beam shown in a dotted line along the axis of tube 26.

From this description it follows that if an alternating vertical force is applied to crystal 4, and no force is applied to crystal 5, the luminous spot on the screen 28 will oscillate along the horizontal straight line shown as the $x$ axis, indicated in perspective on screen 28; if, however, an alternating force is applied to crystal 5 and no force is applied to crystal 4, the luminous spot on the screen will be seen as a bright segment along the $y$ axis. The said axes $x$ and $y$ on the screen will be referred to below as the principal axes of the screen 28. From the above description it follows that the motion of the luminous spot on the screen along the principal axis $x$ is caused by an alternating unbalance force applied to bearing 2 and the corresponding motion of said spot along the principal axis $y$ is caused by a similar force appearing in bearing 3.

According to this invention the balancing operation is performed by removing a certain amount of material from balancing weights suitably positioned on the surface of rotor 1 or otherwise located in relation thereto. These balancing weights may be formed by small amounts of a suitable material either soldered or welded or otherwise secured in a few predetermined places as explained below. For a low speed balancing, the balancing weights must be relatively large; however, for balancing at very high speed, these weights can be very small.

Although this invention is applicable for both low and high speed balancing, it is particularly useful in connection with balancing at high speeds for which there exist no practical methods of balancing at present. For these high speeds of balancing, even a very slight change in balancing weights accounts for very considerable changes in forces applied to bearings as will be shown.

The balancing weights 29, 30, 31, 32, and 29', 30', 31', 32' are located in eight balancing planes $a, b, c, d,$ and $a', b', c', d',$ respectively, as shown in Figure 1. The weights 29 and 30 are contained in the same plane passing through the axis of rotation of rotor but are located on opposite sides of it substantially as shown, the weight 29 being in the plane $a$ perpendicular to the axis of rotation and the weight 30 in the plane $b$ parallel to the plane $a$. The balancing weights 31, 32 are located in the same axial plane at right angles to the first mentioned axial plane in which the weights 29 and 30 are contained. Similarly the weights 31 and 32 are on opposite sides of the rotor; in Figure 1, weight 31 is shown to be on the side of the rotor as viewed by the reader and weight 32 on the opposite side which is indicated by dotted lines. The group of weights 29', 30', 31', 32', situated in planes $a', b', c', d'$ is located similarly to the location of weights 29, 30, 31, 32 in planes $a, b, c, d,$ previously described, but closer to bearing 3.

The balancing procedure according to this invention is based on a removal of a certain portion of said weights from predetermined planes $a, b, c, d,$ and $a', b', c', d',$ by means of special stationary removing tools now to be described in connection with Figure 2 showing the removing tools associated with rotor 1 and the weights previously described; numerals relative to the same parts are the same in Figures 1 and 2, of which the latter represents a part of the former confined to rotor 1. Figure 3 shows the axial view of the rotor shown in Figure 2. Referring to Figures 2 and 3, 41 is a rod supported by pedestals 54, 55, shown as fastened to the base plate R on which the balancing machine is mounted; however, in order to avoid the vibrations, the pedestals 54 and 55 may be mounted on a separate base. On the rod 41 are rotatably mounted removing tools 33, 34, 35, 36. All four removing tools are identical so that it is sufficient to describe one of them, for example tool 33 which is shown also in Figure 3. The tool consists of an arc shaped member, the upper and lower portions of which are offset as shown in Figure 2 so as to coincide with planes $a, b,$ at right angles to the axis of rotation of the rotor. At the ends of the arc shaped member there are two holders 37 and 38 which hold suitable abrasive materials shown as pieces 39, 40, in Figure 3, and which may be replaced by any other similar removing tool.

The assembly of the removing tool 33, for example, is mounted on the rod 41 by means of a hub 42 and normally can be maintained in neutral position at which neither of abrasive materials 39, 40 touches corresponding weights 29, 30, contained in planes $a, b$. This neutral position can be secured either by means of a friction between the hub 42 and the supporting rod 41 or by means of suitable springs not shown. The tool assemblies 33, 34, 35, 36 can be slightly rotated one way or the other about this neutral position by means of suitable levers, of which lever 43 shown in Figure 3 in connection with assembly 33 is an example.

If lever 43 is moved upwards in the direction of the arrow shown in Figure 3 the abrasive material 39 comes in contact with weight 30 rotating in plane $b$ and begins to remove the material from it during the rotation of the rotor; if lever 43 is moved downwards, the removal of material takes place from the weight 29 rotating in plane $a$. A similar operation can be obtained by means of other levers, associated with assemblies 34, 35, 36 whereby the removal of weight either from weights 32, 30', 32', for upward motion, or from weights 31, 29', 31', for downward motion of said levers, can be obtained.

By manipulating the four levers attached to the material removing assemblies 33, 34, 35, 36 in the above described manner, it is possible to remove the material from balancing weights 29, 30, 31, 32, 29', 30', 31', 32', shown in Figure 1 either separately or jointly depending whether one or several levers are so operated. It will be shown that for some balancing operations one lever is necessary, for some other two are needed simultaneously. There are, however, no balancing operations which require the use of more than two levers at a time, so that only one operator is required for the balancing operation.

Having described the preferred embodiment of this invention illustrated in Figures 1, 2, 3, I wish to describe now the underlying theory on which it is based which will permit a better understanding of its presumed behaviour.

It is best to conduct this description in three steps:

(A) The description of the performance of the mechanical part of this invention, (B) The description of the performance of the electrical part of it, and (C) The description of the balancing procedure consisting in a suitable control of removal of weights in the mechanical part of this invention in accordance with indications exhibited by the electrical part thereof.

The following description proceeds in the above order.

In view of the fact that, as far as I am aware, the principle of balancing on which this invention is based, has not been applied heretofore, I prefer to review first briefly the essential features of the problem of balancing in general with a view to formulating said novel principle of balancing, which I wish to designate, for the sake of an abbreviation, as balancing with respect to rotating axes, for the reasons which will be apparent from the following.

Figure 4 represents graphically the principal vectorial relations characterizing the dynamics of an unbalanced rotation which can be found in any textbook of the Applied Mechanics, more specifically in the Timoshenko book, "Vibration Problems in Engineering," 1928, pages 28, 39, 40, from which Figure 4 is taken with slight changes, with a view to establishing a connection with the following explanations. Referring to Figure 4, the straight line AB represents diagrammatically and in perspective the axis of the rotor 1 to be balanced; the rotor itself is not shown; the axis AB is shown to be supported by bearings at the points A, B, these bearings corresponding to bearings 2, 3, shown in Figure 1.

From the theory of balancing it is well known that the most general case of unbalance can be represented by two centrifugal forces fixed with respect to the rotor and, hence, rotating with it at the same speed. These forces are shown as vectors $F_1$ and $F_2$ at right angles to the axis AB of rotation and applied at the points $k_1$ and $k_2$ of this axis; the distance of said points $k_1$, $k_2$ from bearings A, B, will be designated by letters $a_1$, $b_1$ and $a_2$, $b_2$, respectively. In general the forces $F_1$ and $F_2$ are unequal and non-coplanar, meaning by the last mentioned expression that these forces generally are not contained in the same axial plane passing through the axis of rotation AB.

It is well known from the theory of balancing that the effect of forces $F_1$, $F_2$ as far as corresponding reactions on bearings A, B is concerned, can be neutralized and the bearings be made to run smoothly without such reactions, if suitable weights and, hence, corresponding centrifugal forces are added in the two so-called balancing planes M, N. The location of these balancing planes M, N is arbitrary and is generally selected by considerations of convenience of each individual problem.

Further, it is also known that a force, say $F_1$, can be balanced by a system of two parallel forces $F_1'$, $F_1''$, situated in balancing planes M, N, respectively, and determined by equations $$F_1 = F_1' + F_1''; \quad F_1 a_1 + F_1 b_1 = 0$$

Similarly the other unbalance force $F_2$ can be neutralized by a system of parallel forces $F_2'$ and $F_2''$ situated also in balancing planes M, N, and satisfying the equations $$F_2 = F_2' + F_2''; \quad F_2 a_2 + F_2 b_2 = 0$$

As the result of this analysis, it follows that the compensating balancing forces $F_1'$, $F_2'$ and $F_1''$, $F_2''$, being situated in the balancing planes M, N, respectively, can be now combined by the law of the parallelogram of forces into the resultant balancing forces $F'$ and $F''$ situated in the balancing planes M and N respectively.

From this well known theory of balancing it follows that a system of balancing forces $F'$ and $F''$ of a suitable magnitude and of a suitable angular position in their respective balancing planes M and N is capable of neutralizing the disturbing action of the unbalance forces $F_1$ and $F_2$ after which the rotating body runs smoothly in its bearings A and B, which is the ultimate object of the balancing procedure.

The principal line of endeavor of practically all inventions relative to the problem of balancing consists in attempting to determine both the magnitude and the angular location of balancing vector forces $F'$ and $F''$ in the balancing planes by observing the maximum deflections and their phase in the bearings by suitable means and in assuming that these maximum deflections are in phase with forces which cause them. In this manner the magnitude and the angular location of balancing weights to be added in the balancing planes M and N is generally determined.

The numerous methods and inventions developed in this connection use various means of recording the magnitude and the angular location of the balancing weights to be added in the balancing planes MN which requires the use of either mechanical, electrical, or optical means or any combination of these means.

The weak point of all these prior methods lies in the fact that the measurements made by said recording means relate inevitably to displacements of the point at which said measurements of recording is being made and that it is tacitly assumed that the forces causing these displacements are in phase with the latter.

For balancing at low speeds this assumption is approximately correct and the results so obtained are generally satisfactory for practical purposes.

As the speed at which the balancing operation is increased the angular difference between a displacement and the force producing it becomes more noticeable due to complicated phenomena of damping, resilience of constraint, gyroscopic phenomena, inertia, damping action of oil films in bearings, and similar factors. There appears thus a certain appreciable parasitic phase angle between the displacement and the corresponding force which is commonly called in the balancing practice the "phase angle," but which should be called more properly the "parasitic phase angle" insofar as it appears in practice as an entirely unknown and unpredictable quantity, particularly at high speeds of balancing. This is the main reason why there are many satisfactory balancing machines in existence capable of balancing at moderately high speeds, say of 4000, 5000, 6000 R. P. M., but there are no machines, as far as I am aware, capable of balancing at much higher speeds, such as 10,000, 15,000, 20,000 R. P. M. or higher, at which some existing rotating machines, such as modern gyroscopes, operate.

On the other hand, the existing practice of balancing a rotor intended for a normal operation at high speed (say 20,000 R. P. M.), at a much lower speed at which it can be balanced by the existing methods (say 5000 R. P. M.), is inadequate. In fact a rotor of this kind may appear to be fairly well balanced at 5000 R. P. M., but if it is speeded up to its normal speed of 20,000 R. P. M., an appreciable unbalance will be observed because the same residual unbalance mass at 20,000 R. P. M. will cause unbalance reactions in bearings sixteen times greater than those which existed at 5000 R. P. M., the centrifugal forces increasing in proportion to the square of the angular velocity of rotation.

With these difficulties in mind, and on the basis of the general theory of balancing outlined in connection with Figure 4, I propose now to explain the fundamental feature of the present invention, which, as previously specified, can be designated as the method of balancing with respect to the rotating axes. The significance of this last mentioned designation will now be explained.

For this purpose assume, to begin with, that the rotor is perfectly balanced initially but that one of the levers of removing tools, for example lever 43 of the tool 33 shown in Figures 2 and 3 is pushed upwards as indicated by the arrow in Figure 3. As the result of this the abrasive material 39 will remove a certain portion of the weight 30 rotating in the plane $b$, which will result in the appearance of a centrifugal vector force $F_x$, shown in Figure 5, representing the axial view on the section of the rotor, say between the planes $a$ and $b$. This rotating vector force $F_x$ is directed along the diameter of the rotor from its axis O towards the weight 29 which is now slightly heavier than the weight 30 because a fraction of the latter has been removed. One can assign arbitrarily to the force $F_x$ so introduced the sign plus which amounts to defining the positive direction on the diameter passing between the weights 29, 30, and contained in the same axial plane as the latter, as shown in Figure 5; this diameter becomes thus an oriented rotating axis $x$ with a definite positive direction on it.

If, instead of moving the lever 43 of the removing tool 33 upwards as first considered, said lever were moved downwards, by a similar line of reasoning one can ascertain that this last mentioned procedure would cause the appearance of the force $-F_x$, directed in the negative direction along the rotating axis $x$, previously defined.

By a similar reasoning one observes that by pushing the lever of the removing tool 34 upwards or downwards, the forces $+F_y$ or $-F_y$ along a perpendicular rotating axis $y$ can be made to appear. The same conclusions are applicable to the other two removing tools 35, 36, but the forces $+F'_x$, $-F'_x$, $+F'_y$, $-F'_y$ brought into play by the operation of these last mentioned tools are confined to the region nearer to the bearing 3, whereas the first mentioned forces $+F_x$, $-F_x$, $+F_y$, $-F_y$ brought into play by the operation of levers associated with tools 33, 34 are located nearer to the bearing 2.

The following conclusions can be formulated from this analysis:

(1) The direction of these various forces $F_x$, $F_y$, $F'_x$, $F'_y$ can be controlled by moving the corresponding levers either upwards or downwards.

(2) The magnitude of said forces depends on the amount of removal of the corresponding weight, that is, on the force with which a corresponding lever is pushed during the removing process as well as on the duration of the latter whichever is more convenient by practical considerations well known to those skilled in the art.

(3) In addition to forces $F_x$, $F_y$, $F'_x$, $F'_y$ oriented along the rotating axes $x$, $y$, as previously considered, the above described method permits introducing the rotating couples as well. For example, if the lever associated with the removing tool 33 is moved upwards and that associated with tool 35 is moved downwards or vice versa, a rotating couple acting in the axial plane substantially containing weights 29, 30, 29', 30' will be introduced, the lever arm $r$ of this couple being indicated in Figure 1. The direction of the couple so introduced will depend whether the levers of tools 33, 35 are moved either upwards and downwards or downwards and upwards, respectively.

The same line of argument holds also for the opposite (upwards and downwards or vice versa) operation of levers associated with tools 34, 36. The only difference in this last mentioned case will be in the fact that the plane of rotating couple so introduced will be at right angles to the couple introduced by the opposite operation of levers associated with tools 33, 35.

One objection can be formulated in connection with the above simple analysis of the method of balancing with respect to the rotating axes. For example, assume that the operation of the lever 43 associated with tool 33 is considered. According to whether this lever is pushed either upwards or downwards, either the force $+F_x$ or $-F_x$ is produced as above explained. As far as forces are concerned the analysis is correct; a slight drawback is seen however in that the plane in which these forces either $+F_x$ or $-F_x$ appear are not exactly the same plane, being separated by a small distance $r_0$ shown in Figure 2. It follows, therefore, that adjustment of forces according to this method is accompanied by a slight disturbing couple having $r_0$ as its lever arm.

The above mentioned drawback is, however, negligible in practice for the two reasons—

(1) The slight disturbance in the balance of couples so occurring is proportional to the ratio of lengths $$\frac{R_0}{r}$$

shown in Figure 2, and can be made negligible by a suitable design.

(2) The actual balancing procedure in accordance with this invention deals with the state of unbalance considered as a whole, absorbing both static and dynamic components as felt on both bearings simultaneously, which permits a continuous process of balancing by a rapidly convergent procedure in which all corrections are continuously reduced as will be explained below.

From the foregoing description of the method consisting on varying the forces and couples referred to the rotating axes, the fundamental advantage of this method becomes manifest. In fact, the forces caused by the unbalance are fixed with respect to the rotating system of reference; on the other hand according to the method disclosed I am able to control the component balancing forces such as $F_x$, $F_y$, $F'_x$, $F'_y$, along the rotating axes both in direction and in magnitude; it is thus possible to produce such values of component balancing forces $F_x$, $F_y$, $F'_x$, $F'_y$, which will balance exactly the primary unbalance forces $F'$, $F''$, reduced to balancing planes M, N as previously explained in connection with Figure 4. It is also obvious that the above line of argument developed in connection with forces is equally applicable to couples.

Having described the mechanical features of this invention, which as previously stated can be designated as the method of balancing with respect to the rotating axes, I wish to describe now the electrical features thereof as illustrated in Figure 1. These electrical features ultimately result in the appearance of a certain luminous curve on the screen 28 of the cathode ray tube 26 shown in Figure 1. The purpose of the following description is to show how from the size, form, and orientation of said luminous curve and its modification under the effect of balancing with respect to the rotating axes, information guiding the balancing procedure can be obtained.

Following the descriptions and explanations developed in connection with Figure 4, it can be shown that the existence of a general state of unbalance can be analyzed also in the two planes perpendicular to the axis of rotation and passing through the centers of bearings A and B shown in Figure 4, and indicated by numerals 2, 3 in Figure 1. In these planes the rotating reaction applied to the bearings can be represented by two forces, represented as vectors $F_A$ and $F_B$. In the most general case these forces $F_A$ and $F_B$ are unequal and non-coplanar; the last designation means that they are contained in two axial planes forming an angle $\phi$ with each other as shown on the right end of Figure 4 at the bearing B.

The components $f_A$ and $f_B$ of these rotating forces along the vertical stationary axes to which crystals 4 and 5 respectively shown in Figure 1 respond, are therefore of the form:

$$f_A = F_A \cos \omega t; \quad f_B = F_B \cos (\omega t - \phi) \quad (1)$$

where $$\omega = \frac{2\pi (\text{R.P.M.})}{60}$$

is the angular velocity of rotation in radians per second.

$t$ is the time.
(R. P. M.) is the number of revolutions of the shaft per minute.

These alternating vertical forces $f_A$, $f_B$ applied to crystals 4 and 5 respectively through the well known instrumentality of the piezo-electric effect and the subsequent amplification in tubes 12 and 13 adjusted to be the same for both tubes by means of contacts 20, 21, are finally represented by two alternating voltages $V_x$ and $V_y$ applied to the deflecting plates 24, 24' on the one hand and 23, 23' on the other hand.

These voltages can be also expressed by equations of a similar form as Equation 1, that is:

$$v_x = V_A \cos \omega t; \quad v_y = V_B \cos (\omega t - \phi) \quad (2)$$

The amplitudes $V_A$, $V_B$ of these alternating voltages are proportional to forces $F_A$, $F_B$ previously mentioned. It must be noted that the relative phase angle $\phi$ between the voltages $v_x$ and $v_y$ is the same as between the rotating vectors $F_A$, $F_B$. In fact, since both the tube channels 12 and 13 are identical, any additional parasitic phase angles that may appear either in the tubes or in the machnical system cancel out and it is the relative phase angle $\phi$ which determines the ultimate shape of the curve on the screen 28 shown in Figure 1.

It is to be noted that the major difficulty experienced in connection with the absolute determination of the phase angle in the existing balancing machines is eliminated in this invention. In fact, any attempt to determine the absolute value of the phase angle in the existing machines is handicapped by the existence of an unknown and unpredictable parasitic phase angle appearing partially in the electric filters or other parts of electric circuits and partially in complicated mechanical phenomena as previously explained.

In case of this invention, however, in view of two identical amplifier channels and the identity of dynamical conditions associated with bearings A and B, the effect of parasitic phase angles cancels out in both channels and only the relative phase angle is preserved; the said relative angle is used for guiding the balancing procedure by the shape, size, and orientation of the luminous curve recorded on the screen 28 of the cathode ray tube.

I propose now to establish the equation of the luminous curve on the screen 28 which will define its form as well as its orientation for the various cases considered below and to show further how the observations of said form or said orientation of the curve or of its modifications permit guiding the balancing operation according to this invention.

Since the deflections $x$, $y$, of the luminous spot on the screen 28 are proportional to the voltages, in terms of said deflections, Equation 2 can be written as:

$$x = \alpha \cos \omega t; \quad y = \beta \cos (\omega t - \phi) \quad (3)$$

where $x$ and $y$ designate the deflections of the luminous spot on the screen along the principal axes $x$ and $y$ respectively as previously defined and $\alpha$ and $\beta$ are the amplitudes of these deflections proportional to the magnitude of forces $F_A$ and $F_B$ respectively.

The second Equation 3 can be written as:

$$y = \beta \cos (\omega t - \phi) = \beta (\cos \omega t \cos \phi + \sin \omega t \sin \phi)$$

whence $(y - \beta \cos \omega t \cos \phi) = \beta \sin \omega t \sin \phi$ (4)

Squaring Equation 4 and replacing $$\sin^2 \omega t = 1 - \cos^2 \omega t$$

one has:

$$y^2 - 2y\beta \cos \omega t \cos \phi + \beta^2 \cos^2 \omega t \cos^2 \phi \quad (4a)$$
$$= \beta^2 \sin^2 \phi (1 - \cos^2 \omega t)$$

Rearranging the terms of Equation 4a one has:

$$y^2 - 2y\beta \cos \omega t \cos \phi + \beta^2 \cos^2 \omega t = \beta^2 \sin^2 \phi \quad (4b)$$

In this last equation $\cos \omega t$ can be expressed from the first Equation 3, namely:

$$\cos \omega t = \frac{x}{\alpha}$$

Substituting for $\cos \omega t$ its value $$\frac{x}{\alpha}$$

in Equation 4b one obtains after the reduction to a common denominator $\alpha^2$ which is dropped thereafter, the following expression:

$$\alpha^2 y^2 - 2\alpha\beta xy \cos \phi + \beta^2 x^2 = \alpha^2 \beta^2 \sin^2 \phi \quad (5)$$

Equation 5 is the basic equation and will be now discussed. Before considering however the general case represented by Equation 5, it is useful for the following to study a series of particular cases which will permit establishing a relation between the form, size and orientation of the curve in each case with a corresponding balancing problem.

First case, a pure static unbalance, wherein:

$$\phi = 0, \text{ hence } \sin \phi = 0, \cos \phi = 1$$

The fact that $\phi = 0$ physically means that the rotating forces $F_A$, $F_B$ shown in Figure 4 are coplanar; in other words, in this case one has a purely static unbalance, shown in Figure 6B. Equation 5 becomes in this case:

$$(\alpha y - \beta x)^2 = 0 \text{ that is } \alpha y - \beta x = 0$$

Otherwise written it is:

$$y = \frac{\beta}{\alpha} x \qquad (5,1)$$

Equation 5,1 represents a straight line situated in the first quadrant defined by positive directions of axes $x$ and $y$, passing through the origin and having the slope $\gamma$ defined by equation:

$$\text{Tan } \gamma = \frac{\beta}{\alpha}$$

The luminous line D observed on the screen in this case is situated in the first and third quadrant as shown in Figure 6A. The length of this luminous segment D is proportional to the resultant force F of the static unbalance and its slope is indicative of its position along the axis of rotation. If the static unbalance force F approaches the bearing A, which is indicated as 2 on Figure 1, the luminous line turns towards the $x$ axis, which is shown by arrow on Figure 6A; if this force approaches B (that is bearing 3 on Figure 1) it rotates in the opposite direction.

The luminous line D cannot penetrate, however, in the case of a purely static unbalance, into the shaded region shown in Figure 6A, because the resultant unbalance force cannot occur to the left of the point $K_{10}$ or to the right of the point $K_{20}$ shown in Figure 6B corresponding to the terminal plane 44, 45 of the rotor, as shown in Figure 1. These limit inclinations $\gamma_1 \gamma_2$ of the luminous line can be determined experimentally during a preliminary calibration of the balancing machine by attaching to a perfectly balanced rotor, first a weight in the plane 44. After determining by this procedure the angle $\gamma_1$, a similar preliminary calibration is reproduced by attaching a weight in the plane 45, which determines the other limit slope $\gamma_2$ shown in Figure 6A. It can also be calculated without said preliminary calibration. Conversely if, after these preliminary calibrations, it is observed that the luminous straight line D is situated in the non-shaded sector shown in Figure 6A, this will be indicative of the facts that—

(a) The unbalance forces are coplanar.

(b) That this static unbalance either exists in its pure form, or that it exists in conjunction with the dynamic unbalance, as will be explained in the third case below.

Second case, a pure dynamic unbalance. In this case the unbalance reactions $F_A$, $F_B$ applied to bearings A, B are always equal and opposite as shown in Figure 7A, while still being coplanar. This results from the definition of the couple; in fact for a purely dynamic unbalance there is no resultant force present. The dynamic reactions form in this case a couple, which is balanced also by a couple of reaction in bearings which results in the presence of equal and opposite reaction forces $F_A$, $F_B$ shown in Figure 7B, applied to bearings A and B, said forces being also coplanar. The relative phase angle $\phi$ in this case is 180°, or $\pi$ if the angles are measured in radians. Putting $\phi = \pi$ in Equation 5, which results in $$\cos \phi = \cos \pi = -1; \sin \phi = \sin \pi = 0$$

and putting also $\alpha = \beta$ for the above mentioned reason, one obtains finally:

$$y = -x \qquad (5,2)$$

This is an equation of a straight line D shown in Figure 7A and inclined under the angle $\gamma = 135°$ with respect to the positive direction of the $x$ axis as shown. There is no direction other than $$\gamma = 135° = \frac{3\pi}{4}$$

possible if the unbalance is purely dynamic. The length $aa$ of the luminous segment D, shown in Figure 7A is proportional, all other things being equal, to the magnitude of the couple producing this pure dynamic unbalance.

In practice the presence of either a pure static or a pure dynamic unbalance is exceedingly remote. It will be shown, however, in the following that this invention permits a preliminary experimental reduction of any form of unbalance to the above described pure forms, in which case the experimental procedure of balancing becomes very simple as will be later explained.

Third case, simultaneous presence of pure static and pure dynamic coplanar unbalances. This case is shown in Figure 8B, in which $F_s$ is the resultant force of the static unbalance, giving rise to coplanar reactions $F_A$, $F_B$; and $F''F''$ is a coplanar dynamic unbalance couple having lever arm $n$. The corresponding reactions in the bearings are $F''_A$ and $F''_B$. It is seen from Figure 8B that in this case under certain particular conditions easily ascertained by an elementary calculation omitted here, the effect of corresponding static and dynamic reactions may cancel out in one of the bearings. For the position of the resultant force $F_s$ of the static unbalance and of the couple $F''F''$ of the dynamic unbalance shown, it is seen from an off-hand consideration that this cancelling out may occur at the bearing B. When this condition exists, the bearing B becomes a center of percussion. In such a case the shaft runs smoothly in bearing B, but the hammering continues in bearing A under the joint effect of reactions $F_A$, $F'_A$. Since no alternating forces are applied in this case in bearing B, the alternating voltage resulting from the alternating forces applied to crystal 5, shown in Figure 1, disappears and, hence the vertical motion of the luminous spot on the screen 28 ceases. The motion of the luminous spot is then confined to the $x$ axis, as shown in Figure 8A. If the center of percussion would occur in the other bearing A, by a similar line of argument one concludes that the luminous line D', shown in Figure 8A would coincide with the $y$ axis on the screen.

Conversely if it is observed that the luminous line D (or D') coincides with one of the principal axes $x$, $y$ of the screen of the cathode ray tube 26, a conclusion can be derived from this fact that the corresponding bearing becomes a center of percussion. More specifically, if the luminous line coincides with the $x$ axis, the bearing B is the center of percussion; if it coincides with the $y$ axis, the bearing A is the center of percussion.

Having ascertained all possible cases of a pure static and a pure dynamic unbalance as well as of their copolanar combination with respect to the corresponding luminous record observed on the screen of the cathode ray oscilloscope arranged to respond to the unbalance forces in the above described manner, I wish to analyze now the effect of non-copolanar unbalance forces on the luminous image observed on said screen.

Fourth case. Before analyzing the most general case when the reactions in bearings are unequal and form any angle $\phi$, which is represented mathematically by Equation 5, I wish to describe first an additional particular case when $$\phi = 90° = \frac{\pi}{2}$$

shown diagrammatically in Figure 9B. Referring to Equation 5 in which $$\sin \phi = \sin \frac{\pi}{2} = 1; \cos \phi = \cos \frac{\pi}{2} = 0$$

one obtains:

$$\alpha^2 y^2 + \beta^2 x^2 = \alpha^2 \beta^2$$

Dividing this equation by $$\alpha^2 \beta^2$$

one has:

$$\frac{x^2}{\alpha^2} + \frac{y^2}{\beta^2} = 1 \qquad (5, 4)$$

This equation represents an ellipse referred to the principal axes $x, y$. On the screen 28 of the cathode ray oscillograph the luminous curve will be then an ellipse referred to the principal axes $x, y$ of the screen and shown as curve D in Figure 9A. This curve D presupposes that the unbalance reaction $F_A$ in bearing A is greater than the corresponding reaction $F_B$ in bearing B. If, on the contrary the reaction $F_B$ is greater than $F_A$, the luminous ellipse has the form D' shown in Figure 9A. If the rotating reaction forces $F_A$ and $F_B$ happen to be equal, the ellipse reduces itself to a circle D''.

It is to be noted also that in case the vector force $F_B$ shown in Figure 9B is oppositely directed as shown in dotted lines, angle $\phi$ in this case is 270°, or $$\frac{3\pi}{2}$$

if measured in radians. The other reaction $F_A$ remaining the same, the luminous elliptic curve in this case would be exactly the same as in the above described case when $$\phi = \frac{\pi}{2} = 90°$$

all other factors remaining the same.

Having described these various particular cases, the general case mathematically represented by Equation 5 will now be analyzed.

As is well known from analytical geometry (e. g. see textbook by C. Smith, entitled "Conic sections; Coordinate Geometry," Chapter IX) Equation 5 represents an ellipse E, not referred to the principal axes, as shown in Figures 10A and 10C corresponding to the state of unbalance shown diagrammatically in Figure 10B. In this last mentioned figure, angle $\phi$ may have any value except the values $$\phi = 0, \pi, \frac{\pi}{2}, 3\frac{\pi}{2}$$

previously considered in connection with the above described four particular cases, which, for that reason, will be now excluded.

In practice this general case will be practically the only one to be considered at the beginning of the balancing operation. While there is no difficulty in establishing additional relations connecting the form as well as the orientation of axes of the luminous ellipse observed on the screen in this general case with respect to the principal axes $x, y$ on that screen, there is no further advantage in proceeding in this direction because the general method of balancing according to this invention can be now ascertained.

In order to abbreviate the following description, I propose to use a conventional language, the significance of which will be apparent from the following. Referring to Figure 2 showing the arrangement of removing tools 33, 34, 35, 36 in their relative position with respect to the rotor to be balanced, I will designate as "operation ($\pm$ 33)", an operation in which the lever 43 of the removing tool 33 is moved upwards as shown by arrow in Figure 3, which results in the removal of material from the balancing weight 30 situated in plane $b$ and in the corresponding production of the balancing force $\pm F_x$ directed along the positive direction of the rotating axis $x$ shown in Figure 5. Accordingly by "operation (—33)" will be designated the case when said lever 43 is moved downwards which results in the removal of material from the weight 29 located in plane $a$, shown with the consequent production of the balancing force $-F_x$ directed along the negative direction of said $x$ axis. Likewise operations (—34) and (+34) will result in the removal of material from balancing weights 31 and 32 situated respectively in planes $c$ and $d$ with the consequent appearance of balancing components of forces $+F_y$ and $-F_y$ directed along the perpendicular rotating axis $y$.

Operations (+35), (—35), (+36), (—36) will be similarly defined with respect to the removing tools 35, 36, balancing weights 29', 30', 31', 32' and the corresponding balancing forces $+F'_x$, $-F'_x$, $+F'_y$, $-F'_y$ not shown but similarly directed as the first mentioned non-primed balancing forces but situated nearer the bearing 3.

The conventional terminology so defined is convenient inasmuch as it permits reducing long sentences to the above symbolic expressions. Thus, for example, according to this convention, an operation (+33, +35) will result in the introduction of coplanar balancing forces $+F_x$, $+F'_x$ in the previous notations; an operation (+33, —35) will result in the production of a force $+F_x$ near the bearing 2 and of a corresponding force $-F'_x$ near the bearing 3, which will result accordingly in the appearance of a rotating couple situated in the rotating axial plane defined by the rotating axis $x$ or $x'$; likewise an operation (—33, +35) will result in the appearance of a similar couple located in the same plane $xx'$ but having an opposite direction.

Similarly operations (+34, +36) or (—34, —36) will result in the appearance of coplanar balancing reactions directed respectively along either positive or negative direction of the rotating $y, y'$ axes. Likewise operations (+34, —36) or (—34, +36) will cause the production of balancing rotating couples situated in the axial rotating plane determined by said rotating axes $y, y'$ either in one or the other direction.

It is seen thus that these various simple operations, or combinations of simple operations in pairs, permit changing the balancing forces as well as the balancing couples both in magnitude and in direction relatively to the rotating axes with respect to which the original unbalance forces $F_1, F_2$ as well as their components in the various planes such as planes $a, b, c, d, a', b', c', d'$, remain fixed.

This permits obtaining rapidly a state of final perfect balance in one single continuous balancing procedure applicable to balancing at any speed however high. This also permits obviating the great difficulties incident to the existence of a parasitic phase angle, inherent in the existing balancing machines.

In order to show how the balancing operation is performed with the balancing machine forming the object of this invention, assume that at the beginning of the balancing the luminous curve observed on the screen 28 of the cathode ray oscillograph has the form shown in Figure 10A, evidencing the existence of unequal and non-coplanar rotating reactions F<sub>A</sub> and F<sub>B</sub> in bearings A, B, respectively as previously explained.

In order to begin the balancing procedure, one can start with any one of the eight simple balancing operations: (+33), (−33), (+34), (−34), (+35), (−35), (+36), (−36), arbitrarily selected.

Assume that one starts with operation (+33) and observes the ellipse after the transient condition, caused by the removal of material, has died out, which will take a short time, say, a second or so. Two cases are possible:

(1) The original ellipse becomes wider approaching the circle.
(2) It becomes narrower, approaching a straight line.

Assume the latter condition; one can again apply the operation (+33), or if one wishes to avoid the excessive removal of material from the same balancing weight one can try the operation (+35) which gives rise to a balancing force coplanar with that which is caused by the operation (+33).

As the result of these operations the original ellipse D will become more elongated and narrower as shown by curve D' in Figure 10A. It must be noted that in general there will be observed a certain change in the orientation of the principal axis of the ellipse with respect to the principal axis $x$ on the screen represented by angle $\gamma$, which will become now $\gamma'$ after said first trial operation. The above described procedure of "narrowing" the ellipse from the form D to the form D' physically means that the state of the balance gradually approaches that of a purely static unbalance when the ellipse degenerates finally into a straight line D<sub>0</sub> as was investigated in the first particular case for $\phi=0$ and illustrated in Figure 6A. When this last mentioned condition is reached a purely static unbalance exists, as shown in Figure 6B. As soon as this point is reached during the balancing operation, the subsequent operation will be either (+33, +35) or (−33, −35) whichever gives the reduction of length of the luminous straight line D<sub>0</sub>. If both these operations fail to cause an appreciable change of the length of the line D, this fact will indicate that the balancing forces introduced by the removal of material (such as +F<sub>x</sub>, +F'<sub>x</sub> or −F<sub>x</sub>, −F'<sub>x</sub>) are substantially at right angles to the unbalance reactions F<sub>A</sub>, F<sub>B</sub> in bearings A and B respectively. In such a case an alternative operation (+34, +36) or (−34, −36) should be tried; one of these operations will certainly cause a gradual reduction of the length of line D<sub>0</sub> and this particular combination of operations must be continued until the line D<sub>0</sub> shrinks to one point, which is the criterion of a perfect balance in both bearings A and B.

There may be another possibility when the ellipse initially has a form shown in Figure 10C. By making a few trial elementary operations such as (+33), (−33), (+34), (−34), etc. one can easily find a condition at which the original ellipse D will become more elongated and more narrow such as ellipse D', shown in Figure 10C. In such a case the operation should be continued until the ellipse gradually degenerates into a straight line D<sub>0</sub>, which in this case will be a line bisecting the angle formed by the negative directions of the principal axes on the screen 28. When this condition is reached there is an evidence that the initial unbalance by means of the above described preliminary operations has been reduced to a pure dynamic unbalance as described in the second particular case $\phi=\pi=180°$ and illustrated in Figures 7A and 7B. As soon as this stage of the balancing procedure is reached operations (+33, −35) or (−33, +35) must be tried and one which causes a reduction of the length of the luminous line D<sub>0</sub> shown in Figure 10A should be continued until this line shrinks to one point, which indicates the state of a perfect balance.

If neither of the above mentioned combinations (+33, −35) or (−33, +35) gives an appreciable change of the length of line D, this indicates that the plane of the balancing couple so introduced is at right angles to the plane of the couple causing the dynamic unbalance. In such a case alternative combinations will be (+34, −36), (−34, +36); one of these causing a reduction of the length of the luminous line D<sub>0</sub> must be continued until this line shrinks to one point which indicates again the state of a perfect balance.

The above disclosed procedure of balancing with respect to the rotating axes determined by the diameters in the plane of the weights 29, 30, (29', 30') on the one hand and the diameters in the plane of weights 31, 32, (31', 32') on the other hand guided by the shape as well as by the orientation of luminous curves on the screen 28, as above described, is quite general and capable of a number of other experimental procedures.

Thus for example, instead of proceeding along the line of a gradual narrowing of the original luminous ellipse D shown in Figures 10A and 10C, the balancing procedure may follow an opposite course, that is that of a gradual widening of said ellipse through the instrumentality of preliminary trial operations as above described.

Assume, for instance, that the preliminary trial operation results in a widening of the ellipse with the incidental change of the angle $\gamma$ between the axis of the ellipse and the principal axis X of the oscillographic screen. Continuing this operation, a state of the balance will be eventually reached when the luminous ellipse will appear as referred to the principal axes on the screen, as shown in fourth particular case for $$\phi=90°=\frac{\pi}{2}$$

(in radians) and shown in Figure 9A. When this point is reached the reaction forces F<sub>A</sub>, F<sub>B</sub> applied to bearings A, B, respectively are at right angles to each other. One of the combination trial operations such as (+33), (+36), or (−33), (+36), or (+33), (−36), or (−33), (−36), will eventually result in a gradual reduction of the ellipse to a point which is the criterion of a perfect balance.

It is thus seen that the number of different procedures by which the balancing procedure can be best carried out is considerable and that a skilled operator can rapidly guide the balancing operation to the state of a perfect balance. In selecting one or the other procedure the following general rules must be kept in mind.

(a) A balancing operation carried out by means of operations such as (±33) or (±34) changes obviously the reaction force F<sub>A</sub> in bearing 2 shown in Figure 1 to a greater extent than that in bearing 3 because said removing tools 33, 34, are nearer to bearing 2 than to the bearing 3. Conversely, balancing operations (±35), (±36)

modify more the reactions in bearing 3 than in bearing 2 for the same reason. This results directly from the law of decomposition of a force into parallel components as explained in connection with Figure 4.

(b) A balancing operation, upon the reduction of the general state of unbalance to a purely static form shown in Figures 6A and 6B, requires a combination of operations (+33) (+35); (−33), (−35); or (+34) (+36); (−34) (−36) of the same sign, which is apparent from the previous discussions relative to the decomposition of a force into two parallel components.

(c) A balancing operation, upon the reduction of the general state of unbalance to a purely dynamic form shown in Figures 7A and 7B, requires a combination of operations (+33) (−35); (−33) (+35); or (+34) (−36); (−34) (+36) of opposite signs, which is also apparent inasmuch as such operations introduce rotating couples as previously shown.

(d) A balancing operation, upon the reduction of the general state of unbalance to the quadrature ($\phi=90°$) reactions as shown in Figures 9A and 9B, requires a combination of operations (±33), (±36), or (±34), (±35) because these affect quadrature components in both bearings.

(e) If one balancing operation does not produce an appreciable change in the luminous image on the screen, a combination introducing balancing forces at right angles to those previously tried will certainly produce such a reduction leading to a balancing procedure rapidly converging towards the state of a final perfect balance.

(f) Balancing combinations of the type described will always result eventually in a final state of a perfect balance because being given any arbitrary unbalance vector force $F_A$ or $F_B$ stationary with respect to the rotating axes $x$, $y$, shown in Figure 5 and contained in the axial planes of balancing weights, it is always possible to find such compensating components $F_x$, $-F_x$, $F_y$, $-F_y$, along said rotating axes which will cancel the initial unbalance reactions $F_A$, $F_B$ in bearings A, B (or in bearings 2, 3 shown in Figure 1) whatever their direction and magnitude with respect to said rotating axes.

Summing up the results of the preceding analysis relative to the performance of the balancing machine forming the subject of this invention, it can be stated that the approach to the state of a perfect balance is carried out according to this invention by a continuous procedure and by a rapidly convergent sequence of balancing operations, each succeeding operation improving and correcting the results obtained by the preceding operation. These balancing operations are guided by the prevailing state of the total unbalance existing in both bearings simultaneously and exhibited by the form, size, and orientation relative to the principal axes on the screen of luminous curve characterizing said state of total unbalance in the above decsribed manner.

Although, as previously stated, the balancing machine of the type described can be adapted both for low speed rotors and for high speed rotors, its advantages are particularly marked for very high speed rotating machinery such as modern gyroscopes, for which there exist no methods of obtaining a rapid and continuous balancing at the full rated speed of their rotation.

The existing methods require a long and painstaking procedure of balancing at considerably lower speeds than that for which these rotors are normally intended. Each subsequent adjustment of balancing weights requires stopping the rotor and its subsequent acceleration, which generally requires a very long time, and upon its completion there is still no certainty as to the ultimate behaviour of the rotor at its normal high speed for which the existing balancing methods are not applicable.

With the balancing method according to this invention, the balancing procedure will probably be finished by the time the rotor comes up to its full speed, which time is generally considerable, being of the order of several minutes or even an appreciable fraction of one hour.

According to the procedure inherent in the use of this invention, the rotor will be balanced gradually when the speed is yet relatively small, the initial avoirdupois unbalance great, and the centrifugal reactions in bearings relatively moderate due to said small speed. As the speed increases and the balancing procedure continuing from time to time, say, every minute or so, the avoirdupois unbalance removed each time decreases but the effect of this residual unbalance increases due to the increasing speed, in proportion to the square of the latter.

If the rotor happens to pass through a series of critical speeds, the balancing operation must be momentarily discontinued during such periods of critical speeds and resumed thereafter, when the critical speed has been passed.

As the speed increases the removal of material by tools 33, 34, 35, 36, required for balancing becomes smaller and smaller and the changes in the shape as well as in the orientation of the luminous curve on the screen in response to the slightest touches of the abrasive material from the rapidly rotating balancing weights becomes more and more pronounced.

The balancing operation is thus conducted progressively in a continuous manner and by the time that the rotor reaches its final high speed of normal operation, it will be thus perfectly balanced.

From the above discussion it follows that in addition to the above mentioned advantage of finishing the balancing operation by a continuous procedure by the time the rotor reaches its normal speed, this invention offers an additional advantage by providing conditions by which the balancing operation is effected at substantially constant centrifugal reactions in the bearings and, hence, in the piezo-electric elements 4, 5, as well as in the voltages transmitted through the tubes 12, 13, shown in Figure 1. This last mentioned advantage is particularly important from the standpoint of the engineering design of the pressure responsive elements 4, 5, as well as the amplifying systems. Furthermore, it permits reducing the amount of adjustments by means of the connection 22 shown in Figure 1 to a minimum, as the balancing operation goes through its subsequent stages.

Although I have described a particular embodiment of this invention, I wish it to be understood that many modifications and changes in said embodiment are possible without any departure from the scope of this invention as defined in the following claims.

Having thus described the invention, what is claimed as new and desired to be secured by Letters Patent is:

1. In an apparatus for indicating the state of unbalance of a rotor, bearings supporting said rotor at points spaced axially thereof, means for rotating said rotor, a piezo-electric system associated with each of said bearings, an amplifier system comprising two amplifier channels one connected with each of said piezo-electric systems, said amplifier systems serving to amplify the alternating voltages generated in said piezo-electric systems by the forces of unbalance at said respective bearings, a cathode ray tube, and means connecting the respective pairs of deflecting plates of said tube with said amplifying systems whereby a luminous curve is produced on the screen of said tube which is indicative of the state of unbalance at both of said bearings.

2. In an apparatus for indicating the state of unbalance of a rotor, bearings supporting said rotor at points spaced axially thereof, means for rotating said rotor, a piezo-electric system associated with each of said bearings, an amplifier system comprising two amplifier channels one connected with each of said piezo-electric systems, said amplifier systems serving to amplify the alternating voltages generated in said piezo-electric systems by the forces of unbalance at said respective bearings, means for adjusting the amplification factor of each of said channels, means for adjusting the amplification ratio of both channels simultaneously by equal amount, and a cathode ray tube having two pairs of deflecting plates arranged to be influenced by the amplified voltages across the output terminals of said channels so as to obtain a luminous curve on the screen of said tube which is indicative of the state of unbalance at both of said bearings.

3. A method of balancing a rotor which comprises supporting said rotor at axially spaced points, affixing weights to said rotor at points spaced from the axis and in a plurality of different planes which include the axis of rotation, rotating said rotor, obtaining a piezo-voltage at each of said points of support proportional to the pressure reactions due to unbalance at said points, amplifying said voltages and converting them into a combined visual image which exhibits both the magnitudes and directions of said forces, and selectively removing portions of said weights during rotation, and in accordance with said indication until said image narrows to a point, which corresponds to a state of balance of the rotor, all without interrupting the rotation thereof.

NICOLAI MINORSKY.

REFERENCES CITED

The following references are of record in the file of this patent:

UNITED STATES PATENTS

| Number | Name | Date |
| --- | --- | --- |
| 2,040,733 | Guest | May 12, 1936 |
| 2,193,079 | Schrader | Mar. 12, 1940 |
| 2,322,561 | Bevins et al. | June 22, 1943 |
| 2,329,654 | Rouy | Sept. 14, 1943 |

FOREIGN PATENTS

| Number | Country | Date |
| --- | --- | --- |
| 399,845 | Great Britain | Oct. 13, 1933 |
| 527,788 | Great Britain | Oct. 16, 1940 |